Patented Sept. 3, 1929.

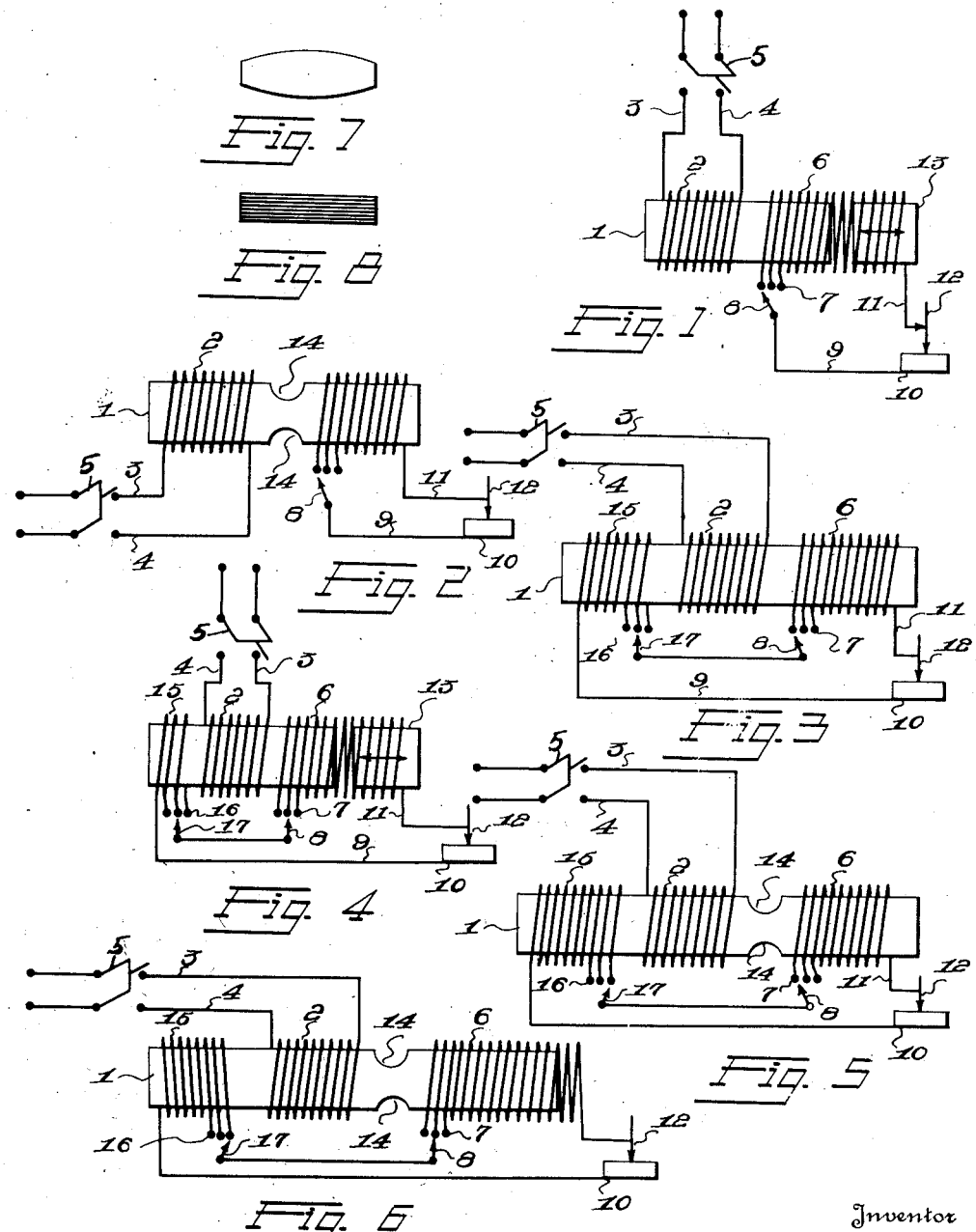

1,727,224

UNITED STATES PATENT OFFICE.

CHARLES B. WATERS, OF MONTCLAIR, NEW JERSEY.

ALTERNATING-CURRENT ARC WELDING APPARATUS.

Original application filed February 4, 1924, Serial No. 690,490. Divided and this application filed March 20, 1926. Serial No. 96,262.

The present invention relates to new and improved forms of alternating current arc welding apparatus, and the present application is a division of application Serial Number 690,490, filed February 4, 1924.

Arc welding transformers heretofore proposed have had the windings thereof disposed on completely closed magnetic cores. By experimentation and research I have discovered that it is possible to produce an efficient and satisfactory welding transformer arrangement, with a straight open core arrangement, and that the secondary current supply may be regulated in a number of ways.

By the application of my invention or discovery it is possible to produce a low cost welding arrangement in which the windings may be produced in standard machine wound coils, enabling the adoption of quantity production methods and a corresponding reduction in the production, eliminating a great proportion of assembly work.

A further advantage of the present invention or discovery is that machines are adaptable to a wide range of welding conditions, and afford more flexible arrangements than have been heretofore possible. In certain forms hereinafter disclosed it is possible to completely suppress the secondary arc effect and produce a low voltage heavy preheating current in the work to be welded, or the arc effect may be merely partially suppressed and a partial heating effect simultaneously obtained. The method of operation by partially suppressing the arc effect and increasing the heating effect of the current flow in the work is particularly effective in welding certain types of work, for example, in filling up scores in cast cylinders and work of a like nature.

An object of the invention is to provide simplified and efficient arc welding arrangements in which the above advantages may be effectively attained.

A further object of the invention is the provision of arc welding arrangements in which new and improved principles of control, regulation, and structure are utilized.

Other objects of the invention will appear in the following disclosure of the details and operation of preferred embodiments of the invention of which:

Figures 1 to 6 inclusive represent in diagram different forms of the invention.

Figure 7 represents a plan view of a more or less parabolic form of core, and

Figure 8 represents a side elevation of the core shown in Figure 7.

Referring to Figure 1, a core 1 has wound thereon a primary winding 2 which may be connected to a source of alternating current by leads 3 and 4 and a switch 5. A secondary winding 6 is provided which is connected by taps 7, switch arm 8 and lead 9 to a piece of work 10 to be welded; and by lead 11 to a welding electrode 12. Winding 6 extends beyond the end of core 1 so that a portion thereof becomes an external inductance, and a movable magnetic core section 13 is provided which may be adjusted in the section of coil 6 extending beyond core 1 to vary the inductance thereof. The windings 2 and 6 are preferably secured in fixed relation with respect to core 1, and are spaced apart on the core to induce substantial flux leakage between the primary and secondary windings. Suitable mechanical means are of course provided to effect the relative adjustment of the core section 13 but since such mechanical details are no part of the present invention, they are unnecessary to enable an understanding of the invention to be had and may be provided by a skilled mechanic, no disclosure thereof being here necessary.

The purpose of the relative spacing of coils 2 and 6 and the adjustability of core 13 is to vary the degree of transformer effect, to vary the magnetic leakage beween the primary and the secondary coil, and to vary the inductance effect in the welding circuit.

It will therefore be clear that coil 2 may be movable and coil 6 relatively fixed, or both coil 2 and coil 6 may be relatively movable with respect to the core without departing from the principle of the invention.

It is found in operation that the secondary current and voltage may be regulated by adjusting the relative position of core 13, so that a stable arc may be attained between electrode 12 and work 10. A wide range in the relative numbers of turns in the primary and secondary windings may be chosen, and the machine is operative for arc welding under widely differing conditions. Regulation of secondary current and voltage may also be attained by reducing the number of secondary turns by means of taps 7 and switch 8. In the disclosure the switch and taps are shown connected to the end of coil 6 closest to primary winding 2, as the flux density is here greatest and a greater variation in effect is obtained in proportion to the number of turns cut out of the circuit, than if the switch were placed in lead 11.

The great flexibility of this arrangement and stability of welding conditions attained are due to the fact that by shifting the relative position of core 13 leakage reactance and inductive effect may be regulated in this manner to prevent excessive currents being drawn from the line on short circuit, and the open circuit voltage of the secondary together with the inductance in the secondary circuit may be regulated with great accuracy to meet any desired arc conditions. The arc may be partially or completely suppressed for preheating by reducing the number of secondary turns and heating effect increased, or the secondary may be positioned to give a limited arc and heating effect for filling up cylinder scores and like operations.

In Figure 2 a form of the invention is shown in which coils 2 and 6 are relatively fixed, winding 6 is entirely on core 1, and adjustable core section 13 is eliminated. A large percentage of flux leakage is induced between the coils by reducing the section of core 1 at 14. This form is designed for welding work of predetermined character, and the regulation is obtained by the reduction in core section, and adjustment of switch 8.

In Figure 3 a form of the invention is shown in which winding 6 is applied entirely on the core 1, spaced from winding 2 to induce flux leakage, and an auxiliary secondary coil 15 is applied in closely associated relation with primary coil 2 to core 1. Coil 15 is connected in series with coil 6 in a manner so that the voltages induced therein are added to the voltages induced in coil 6. Tape 16 and a switch 17 may be provided to vary the number of effective turns in auxiliary winding 15. Winding 15 is preferably secured in fixed relation with respect to core 1 and coil 2, but may be adjustable with respect thereto if so desired. The addition of auxiliary coil 15 is found to be economical in amount of copper required, and by proper adjustment of switches 8 and 17, or coil 6, or both, a more stable arc may be produced under certain varying conditions.

In Figure 4 the form shown in Figure 1 is modified by the addition of auxiliary secondary coil 15, taps 16 and switch 17, in the manner and for the same purposes as set forth in describing Figure 3. The voltages induced in coils 6 and 15, add to each other, and movable core 13 is utilized to regulate the secondary conditions in the same manner as in Figure 1.

In Figure 5, the form shown in Figure 3 is modified by reducing the section of core 1, as shown at 14, and coil 6 is secured in fixed relation with respect to core 1 and coil 2. As in the form shown in Figure 2 this reduction in core section increases the flux leakage between primary coil 2 and secondary core 1. If desired the windings may be so designed as to produce a stable arc in the secondary for a fixed range of welding conditions, and all adjustments may be eliminated. Or if desired, coil 6 may be adjustable along core 1 for a wider operating range, in the manner hereinbefore described.

In Figure 6 a modification of the form disclosed in Figure 5 is shown. In this form the voltages in coils 15 and 6 are opposed to each other, and a portion of coil 6 extends beyond core 1. Coil 6 may be adjustable along core 1 for purposes of regulation if desired. It has been found that the portion of coil 6 extending beyond core 1 acts as a pure inductance, while the portion on core 1 acts as a transformer, opposing the transformer effect of coil 15. The resultant induced voltage and secondary inductance can be closely regulated by shifting core 6 toward or away from coil 2 to suit particular arc conditions, and an effective welding arrangement is produced.

It will be apparent that the use of a single core upon which the windings are placed produces an inexpensive easily regulatable, and effective welding transformer, with advantages impossible to obtain in the usual closed magnetic circuit core types. Besides the advantages above set forth, a machine adapted for quantity production and rapid assembly is produced.

It is found that the core may be shaped in more or less parabolic form, as shown in Figures 7 and 8, in order that uniform core flux densities are attained, there being less flux threading the ends of the cores than thread the portion under the primary. The exact shapes giving satisfactory results with a minimum of material in the core may be calculated, but are preferably and more easily determined by experiment for each type of machine. These shapes are so made as to give uniform heating along the core and will, of course, vary for each type and size of machine.

I have discovered that the best conditions for metallic arc welding with my improved forms of apparatus are attained when the parts are so proportioned and arranged with relation to each other that 12 to 30 volts are induced across a welding arc, and 50 to 125 volts are induced across the welding terminals on open circuit. The best conditions for any particular class of work are, however, readily determined in practice and easily attained due to the flexibility of and adjustibility of the various forms of the invention hereinbefore described. It will, however, be understood that the invention is not to be limited to working within the voltage range set forth.

Having thus described preferred embodi- ments of my invention, what is desired to be secured in Letters Patent and claimed as new is:

1. An arc welding transformer comprising an open magnetic core with a section of reduced area; a primary winding on said core on one side of said reduced section; and a secondary winding on said core on the other side of said reduced section.

2. An arc welding transformer comprising a magnetic core; a primary winding on said core; and a secondary winding on said core so disposed with relation to said primary winding as to induce substantial flux leakage between said primary and said secondary windings during welding operations; said core being shaped so that substantially uniform flux densities are induced throughout all sections of said core during welding operations.

3. An arc welding transformer comprising a straight magnetic core comprising a section reduced in area; a primary winding on said core on one side of the said reduced area and so disposed with relation to said primary winding as to induce substantial flux leakage between said primary and said secondary windings during welding operations; and an auxiliary secondary winding closely associated with said primary winding and connected in series with said first mentioned secondary winding during welding operations.

4. The combination as set forth in claim 3 in which said first mentioned secondary winding extends beyond the end of said core forming an external inductance connected in series in said welding circuit.

5. An arc welding transformer comprising an open magnetic core; a primary winding on said core; and a secondary coil; a section of which is on said core so disposed with relation to said primary winding as to induce a substantial flux leakage between said primary and said secondary coil during welding operations and the remaining section of said coil extending beyond the end of said core to form an external inductance in series with said welding circuit.

6. The combination as set forth in claim 5 together with an adjustable core extending into the section of said coil extending beyond the end of said first mentioned core.

7. The combination as set forth in claim 5 in which said core is reduced in cross section between said primary and said secondary windings to increase the flux leakage during welding operations.

8. An arc welding transformer comprising a core of varied cross-sectional area and of such shape that substantially uniform flux densities are induced in all parts of a given cross sectional area.

In testimony whereof I affix my signature.

CHARLES B. WATERS.